(12) United States Patent
Clouin et al.

(10) Patent No.: US 9,725,325 B2
(45) Date of Patent: *Aug. 8, 2017

(54) PROCESS FOR PREPARING PRECIPITATED SILICAS

(71) Applicant: RHODIA OPERATIONS, Paris (FR)

(72) Inventors: Malika Clouin, Paris (FR); Sylvaine Neveu, Paris (FR); Joël Racinoux, Rochetaillee sur Saone (FR)

(73) Assignee: Rhodia Operations, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/367,425

(22) PCT Filed: Dec. 19, 2012

(86) PCT No.: PCT/EP2012/076213
§ 371 (c)(1),
(2) Date: Jun. 20, 2014

(87) PCT Pub. No.: WO2013/092749
PCT Pub. Date: Jun. 27, 2013

(65) Prior Publication Data
US 2015/0210555 A1    Jul. 30, 2015

(30) Foreign Application Priority Data

Dec. 23, 2011   (FR) ..................... 11 04090

(51) Int. Cl.
*C01B 33/12* (2006.01)
*C01B 33/193* (2006.01)

(52) U.S. Cl.
CPC .......... *C01B 33/128* (2013.01); *C01B 33/193* (2013.01); *C01P 2004/50* (2013.01)

(58) Field of Classification Search
CPC ... C01B 33/128; C01B 33/193; C01P 2004/50
USPC ....................................... 423/339
See application file for complete search history.

(56) References Cited

U.S. PATENT DOCUMENTS

| | | |
|---|---|---|
| 5,110,574 A | 5/1992 | Reinhardt et al. |
| 5,403,570 A | 4/1995 | Chevallier et al. |
| 5,871,867 A | 2/1999 | Rausch et al. |
| 6,107,226 A * | 8/2000 | Chevallier ............... 501/133 |
| 2003/0118500 A1 * | 6/2003 | Chevallier et al. .......... 423/339 |
| 2004/0062702 A1 * | 4/2004 | Block et al. ............. 423/347 |
| 2005/0032965 A1 * | 2/2005 | Valero ................. 524/493 |
| 2010/0083876 A1 * | 4/2010 | Lahary et al. ............ 106/409 |
| 2011/0178227 A1 * | 7/2011 | Allain et al. ............ 524/554 |
| 2013/0171051 A1 | 7/2013 | Clouin et al. |

FOREIGN PATENT DOCUMENTS

| | | |
|---|---|---|
| CN | 102137813 A | 7/2011 |
| EP | 0520862 A1 | 12/1992 |
| EP | 0754650 A1 | 1/1997 |
| JP | H05201719 A | 8/1993 |
| JP | 2004510679 A | 4/2004 |
| JP | 5727605 B2 | 4/2015 |
| WO | 0230818 A2 | 4/2002 |
| WO | 2010022544 A1 | 3/2010 |
| WO | WO 2013092745 A1 | 6/2013 |
| WO | WO 2013110654 A1 | 8/2013 |
| WO | WO 2013110655 A1 | 8/2013 |
| WO | WO 2013110658 A1 | 8/2013 |
| WO | WO 2013110659 A1 | 8/2013 |

OTHER PUBLICATIONS

U.S. Appl. No. 14/367,455, Malika Clouin, et al.
U.S. Appl. No. 14/373,791, Emmanuelle Allain, et al.
U.S. Appl. No. 14/373,797, Emmanuelle Allain, et al.
U.S. Appl. No. 14/373,799, Emmanuelle Allain, et al.
U.S. Appl. No. 14/373,801, Emmanuelle Allain.

\* cited by examiner

*Primary Examiner* — Anthony J Zimmer

(57) ABSTRACT

A process for preparing precipitated silica comprising a precipitation reaction between silicate and an acid, in which the acid used in at least one of the steps is a concentrated acid, preferably selected from the group consisting of sulfuric acid having a concentration of at least 80% by weight, in particular at least 90% by weight, acetic acid having a concentration of at least 90% by weight, formic acid having a concentration of at least 90% by weight, nitric acid having a concentration of at least 60% by weight, phosphoric acid having a concentration of at least 75% by weight, and hydrochloric acid having a concentration of at least 30% by weight.

13 Claims, No Drawings

PROCESS FOR PREPARING PRECIPITATED SILICAS

This application is a U.S. national stage entry under 35 U.S.C. §371 of International Application No. PCT/EP2012/076213 filed Dec. 19, 2012, which claims priority to French Application No. 11.04090 filed on Dec. 23, 2011, the whole content of this application being herein incorporated by reference for all purposes.

The present invention relates to a novel process for preparing precipitated silica.

It is known practice to use precipitated silicas as a catalyst support, as an absorbent for active materials (in particular supports for liquids, for example that are used in food, such as vitamins (especially vitamin E), choline chloride), as a viscosity enhancer, texturizer or anticaking agent, as a battery separator element, and as an additive for toothpaste or paper.

Precipitated silicas may also be used as reinforcing fillers in silicone matrices (for example for coating electric cables) or in compositions based on natural or synthetic polymer(s), in particular elastomer(s), which are especially diene-based, for example for shoe soles, floor coverings, gas barriers, flame-retardant materials and also technical components such as cable car rollers, seals for domestic electrical appliances, seals for liquid or gas pipes, braking system seals, sheathings, cables and transmission belts.

It is thus known practice to prepare via certain processes, using a precipitation reaction between a silicate and a dilute acid, precipitated silicas that have a good ability to disperse (dispersibility) in the polymer (elastomer) compositions and good reinforcing properties, making it possible to impart to said compositions in which they are incorporated a very satisfactory compromise of properties.

The main objective of the present invention is to propose a novel process for preparing precipitated silica, which can be used as a reinforcing filler in the polymer (elastomer) compositions, that constitutes an alternative to these known processes for preparing precipitated silica.

More preferentially, one of the objectives of the present invention consists in providing a process which, while having an improved productivity, in particular at the level of the precipitation reaction, especially with respect to these prior art preparation processes using, as acid, a dilute acid, makes it possible to obtain precipitated silicas having similar physicochemical characteristics, preferably a relatively high specific surface area and comparable properties, especially as regards their pore distribution, their ability to deagglomerate and disperse (dispersibility) in the polymer (elastomer) compositions and/or their reinforcing properties, to those of the precipitated silicas obtained by these prior art preparation processes.

Another objective of the invention preferably consists, at the same time, in reducing the amount of energy consumed and/or the amount of water used during the preparation of precipitated silica, especially with respect to these prior art processes.

With these aims, the object of the invention is a novel process for preparing precipitated silica, preferably having a good ability to disperse (dispersibility) in the polymer (elastomer) compositions and good reinforcing properties, comprising the reaction of a silicate with at least one acid, whereby a suspension of precipitated silica is obtained, followed by the separation and drying of this suspension, in which:

the precipitation is performed in the following manner:
(i) an initial stock comprising at least a portion of the total amount of the silicate involved in the reaction and an electrolyte is formed, the concentration of silicate (expressed as $SiO_2$) in said initial stock being between 50 and 70 g/l,
(ii) an acid is added to said stock until a pH value of the reaction medium of between 7 and 8.5 is obtained,
(iii) the acid is added to the reaction medium along with, where appropriate, simultaneously the remaining amount of the silicate,
(iv) an acid is added to the reaction medium, preferably until a pH value of the reaction medium of between 4 and 6 and in particular between 4 and 5.5 is obtained,
the separation comprises filtration and washing using a filter equipped with a compacting means,
a suspension, preferably having a solids content of at most 22% by weight, is dried by atomization,
in which process, in at least step (iii), the acid used is a concentrated acid preferably chosen from the group consisting of sulfuric acid with a concentration of at least 80% by weight and in particular of at least 90% by weight, acetic acid or formic acid with a concentration of at least 90% by weight, nitric acid with a concentration of at least 60% by weight, phosphoric acid with a concentration of at least 75% by weight and hydrochloric acid with a concentration of at least 30% by weight.

Advantageously, said concentrated acid is concentrated sulfuric acid, i.e. sulfuric acid with a concentration of at least 80% by weight, preferably of at least 90% by weight.

Sulfuric acid with a concentration of at least 1400 g/l, in particular of at least 1650 g/l, may thus be used as concentrated acid.

Thus, according to one of the essential characteristics of the invention, taken in combination with a succession of steps with specific conditions, in particular a certain concentration of silicate and of electrolyte in the initial stock together with, preferably, an appropriate solids content of the suspension to be dried, the acid used in the entirety of step (iii) is a concentrated acid preferably chosen from the group consisting of sulfuric acid with a concentration of at least 80% by weight and in particular at least 90% by weight, acetic acid or formic acid with a concentration of at least 90% by weight, nitric acid with a concentration of at least 60% by weight, phosphoric acid with a concentration of at least 75% by weight and hydrochloric acid with a concentration of at least 30% by weight.

Advantageously, said concentrated acid is concentrated sulfuric acid, i.e. sulfuric acid with a concentration of at least 80% by weight (and in general of not more than 98% by weight), preferably of at least 90% by weight; in particular, its concentration is between 90% and 98% by weight, for example between 91% and 97% by weight.

According to one embodiment of the process, but which is not the preferred embodiment of the invention, the concentrated acid as defined above is used solely in step (iii).

The acid used in steps (ii) and (iv) may then be, for example, a dilute acid, advantageously dilute sulfuric acid, i.e. having a concentration very much less than 80% by weight, in this instance a concentration of less than 20% by weight (and in general of at least 4% by weight), in particular of less than 14% by weight, especially of at most 10% by weight, for example between 5% and 10% by weight.

However, according to a highly preferred variant of the invention, the acid used in step (iv) is also a concentrated acid as mentioned above.

While, within the context of this highly preferred variant of the invention, the acid used in the entirety of step (ii) may then be, for example, a dilute acid as described above, it may be advantageous, in this variant of the invention, for, in one part of step (ii), in general in a second and last part of this step (ii), the acid used to also be a concentrated acid as mentioned above (the acid used in the other part of step (ii) being, for example, a dilute acid as described above).

Thus, in this step (ii) the acid used until the gel point is reached in the reaction medium (the gel point corresponding to a sudden increase in the turbidity of the reaction medium characteristic of an increase in the size of the objects) may be a dilute acid as mentioned above, advantageously dilute sulfuric acid (that is to say having a concentration of much less than 80% by weight, in this instance a concentration of less than 20% by weight, in general of less than 14% by weight, in particular of at most 10% by weight, for example between 5% and 10% by weight) and the acid used after reaching the gel point in the reaction medium may be a concentrated acid as mentioned above, advantageously concentrated sulfuric acid, that is to say sulfuric acid having a concentration of at least 80% by weight, preferably of at least 90% by weight, in particular between 90% and 98% by weight.

Similarly, in this step (ii), the acid used in the first x minutes of step (ii), with x being between 15 and 25, for example equal to 20, may be a dilute acid as mentioned above and the acid used after the first x minutes of step (ii), with x being between 15 and 25, for example equal to 20, may be a concentrated acid as mentioned above.

In the context of this very much preferred variant of the invention, the acid used in the entirety of step (ii) may also be a concentrated acid as mentioned above, advantageously concentrated sulfuric acid, i.e. with a concentration of at least 80% by weight, preferably of at least 90% by weight, in particular between 90% and 98% by weight. Preferably, in the case of this use, water is added to the initial stock, in particular either before step (ii) or during step (ii).

It should be noted, generally, that this preparation process is a process for the synthesis of precipitated silica, i.e., an acid is reacted with a silicate under specific conditions.

In the process according to the invention, an organic acid such as acetic acid, formic acid or carbonic acid or, preferably, a mineral acid such as sulfuric acid, nitric acid, phosphoric acid or hydrochloric acid is generally used as acid(s) (concentrated acid or dilute acid).

If use is made, as concentrated acid, of concentrated acetic acid or concentrated formic acid, then their concentration is at least 90% by weight.

If use is made, as concentrated acid, of concentrated nitric acid, then its concentration is at least 60% by weight.

If use is made, as concentrated acid, of concentrated phosphoric acid, then its concentration is at least 75% by weight.

If use is made, as concentrated acid, of concentrated hydrochloric acid, then its concentration is at least 30% by weight.

However, very advantageously, use is made, as acid(s), of sulfuric acid(s), the concentrated sulfuric acid then used having a concentration such as already mentioned in the account above.

In general, when concentrated acid is used in several steps, the same concentrated acid is then used.

Use may furthermore be made, as silicate, of any common form of silicates, such as metasilicates, disilicates and advantageously an alkali metal silicate, in particular sodium or potassium silicate.

The silicate may have a concentration, expressed as silica, of between 40 and 330 g/l, for example between 60 and 300 g/l, in particular between 60 and 250 g/l.

Generally, use is made, as silicate, of sodium silicate.

In the case where use is made of sodium silicate, the latter generally has an $SiO_2/Na_2O$ weight ratio of between 2 and 4, for example between 3.0 and 3.7.

As more particularly regards the preparation process of the invention, the precipitation takes place in a specific manner according to the following steps.

A stock which comprises silicate and an electrolyte is first formed (step (i)). The amount of silicate present in the initial stock advantageously represents only a portion of the total amount of silicate involved in the reaction.

According to one characteristic of the preparation process of the invention, the concentration of silicate in the initial stock, expressed as $SiO_2$ equivalent, is between 50 and 70 g/l (for example between 55 and 65 g/l). Preferably, this concentration is between 50 and 65 g/l, in particular between 50 and 60 g/l.

The initial stock comprises an electrolyte. The term "electrolyte" is understood here in its generally accepted sense, i.e. it means any ionic or molecular substance which, when in solution, decomposes or dissociates to form ions or charged particles. Mention may be made, as electrolyte, of a salt from the group of the salts of alkali metals and alkaline-earth metals, in particular the salt of the starting metal silicate and of the acidifying agent, for example sodium chloride in the case of the reaction of a sodium silicate with hydrochloric acid or, preferably, sodium sulfate in the case of the reaction of a sodium silicate with sulfuric acid.

If sodium sulfate is used as electrolyte, its concentration in the initial stock is preferably between 12 and 20 g/l, in particular between 13 and 18 g/l.

The second step consists in adding acid to the composition stock described above (step (ii)).

This addition, which results in a correlative fall in the pH of the reaction medium, is carried out until a pH value of between 7 and 8.5, especially between 7 and 8, for example between 7.5 and 8, is reached.

Once the desired pH value is reached, a simultaneous addition of acid and silicate is then performed in step (iii).

This simultaneous addition is preferably performed such that the pH value is always equal (to within ±0.2) to that reached at the end of step (ii).

Maturation of the reaction medium (aqueous suspension) obtained may be performed after step (iv), this maturation possibly lasting, for example, from 1 to 30 minutes and especially from 2 to 15 minutes.

The temperature of the reaction medium is generally between 68 and 98° C.

According to one variant of the invention, the reaction is performed at a constant temperature, preferably of between 75 and 95° C.

According to another (preferred) variant of the invention, whether step (ii) is performed (completely or partly) or is not performed with concentrated acid, the temperature at the end of the reaction is higher than the temperature at the start of the reaction: thus, the temperature at the start of the reaction (for example during step (i) and part of step (ii)) is preferably held between 68° C. and 85° C., and then the temperature is increased, preferably up to a value between 85° C. and 98° C., at which value it is held (for example during part of step (ii) and during steps (ii) and (iii)) until the end of the reaction.

According to another embodiment of the invention, for example (but not solely) when part of step (ii) is not performed with concentrated acid, all of steps (i) to (iv) may be performed at a constant temperature.

In the process according to the invention, at the end of step (iv), optionally followed by a maturation step, a silica slurry is obtained, which is then separated (liquid-solid separation).

According to another essential characteristic of the preparation process of the invention, said separation comprises filtration and washing using a filter equipped with a compacting means, the compacting pressure preferably being relatively low.

This filter may be a band filter equipped with a roller for compacting.

However, preferably, the separation comprises filtration, washing and then compacting, using a filter press; in general, the pressure at the end of filtration is between 3.5 and 6.0 bar, the compacting time being, for example, at least 20 seconds, especially at least 80 seconds.

The suspension of precipitated silica thus recovered (filter cake) is then dried by atomization.

In the preparation process of the invention, this suspension may have, immediately before being dried by atomization, a solids content of at most 22% by weight. This solids content is preferably at most 20% by weight. It may be less than 17% by weight.

It should be noted that, after the filtration, in a subsequent step of the process, dry material may be added to the filter cake, for example silica in accordance with the invention in pulverulent form.

The drying may be performed using any suitable type of atomizer, in particular a rotary, nozzle, liquid-pressure or two-fluid atomizer.

It should be noted that the filter cake is not always under conditions enabling atomization, especially on account of its high viscosity. In a manner known per se, the cake is then subjected to disintegration. This operation may be performed by treating the cake in a mill of colloidal or ball type. Disintegrating is generally performed in the presence of an aluminum compound, in particular of sodium aluminate, and preferably in the presence of an acid, such as described above (in the latter case, the aluminum compound and the acid are advantageously added simultaneously). The disintegration makes it possible especially to lower the viscosity of the suspension to be subsequently dried.

According to a preferred embodiment of the invention, the drying is performed using a nozzle atomizer. The precipitated silica that may then be obtained is advantageously in the form of beads.

After drying, a milling step may be performed on the recovered product. The precipitated silica that may then be obtained is generally in the form of a powder.

Similarly, according to another embodiment of the invention, the drying is performed using a rotary atomizer. The precipitated silica that may then be obtained may be in the form of a powder.

Finally, the dried (especially by a rotary atomizer) or milled product as indicated previously may, according to another embodiment of the invention, be subjected to an agglomeration step.

The term "agglomeration" means herein any process for binding together finely divided objects to place them in the form of larger sized and mechanically stronger objects.

These processes are especially direct compression, wet granulation (i.e. with use of a binder such as water, silica slurry, etc.), extrusion and, preferably, dry compacting.

When the latter technique is used, it may prove to be advantageous, before carrying out the compacting, to deaerate (operation also referred to as predensifying or degassing) the pulverulent products so as to remove the air included therein and to ensure more uniform compacting.

The precipitated silica that may be obtained according to this embodiment of the invention is advantageously in the form of granules.

The implementation of the preparation process according to the invention, particularly when the concentrated acid used is concentrated sulfuric acid, especially makes it possible to obtain during said process (after step (iv)) a suspension that is more concentrated in precipitated silica than that obtained by an identical process using only dilute acid, and therefore to obtain a gain in productivity of precipitated silica (which may reach, for example, at least 10% to 40%) in particular in the precipitation reaction (i.e. at the end of step (iv)), while surprisingly being accompanied by the production of precipitated silica having a good ability to disperse (dispersibility) in the polymer (elastomer) compositions; more generally, the precipitated silicas obtained by the process according to the invention preferably have physicochemical characteristics and properties, especially as regards their pore distribution, their ability to deagglomerate and disperse (dispersibility) in the polymer (elastomer) compositions and/or their reinforcing properties, comparable to those of the precipitated silicas obtained via an identical process using only dilute acid.

Advantageously, at the same time, especially when the concentrated acid used is concentrated sulfuric acid, the process according to the invention enables, relative to an identical process using only dilute acid, a saving (which may reach for example at least 15% to 60%) in the energy consumption (in the form of live steam, for example), in particular in the precipitation reaction (i.e. after step (iv)), due to a reduction in the amounts of water involved and the exothermicity linked to the use of concentrated acid. In addition, the use of concentrated acid makes it possible to restrict (for example by at least 15%) the amount of water required for the reaction, especially due to the reduction in the amount of water used for the preparation of the acid.

The precipitated silica obtained via the process according to the invention advantageously has both a high specific surface area and a satisfactory capacity for dispersion (dispersibility) and good reinforcing properties, in particular during its use as a reinforcing filler for elastomers, giving these elastomers good rheological and mechanical properties.

The precipitated silica obtained via the process according to the invention generally has the following characteristics:
- a BET specific surface area ($S_{BET}$) of between 180 and 260 m$^2$/g,
- a CTAB specific surface area ($S_{CTAB}$) of between 175 and 250 m$^2$/g,
- a pore distribution such that the pore volume composed of the pores having a diameter of between 175 and 275 Å represents less than 55% of the pore volume consisting of the pores with diameters of less than or equal to 400 Å,
- a pore volume ($V_{d1}$) consisting of the pores with diameters of less than 1 μm of at least 1.50 cm$^3$/g.

The precipitated silica prepared via the process according to the invention preferably has a BET specific surface area of between 185 and 250 m$^2$/g.

Very preferably, its BET specific surface area is between 185 and 215 m$^2$/g, in particular between 190 and 205 m$^2$/g.

Similarly, preferably, the precipitated silica prepared via the process according to the invention has a CTAB specific surface area of between 180 and 240 m²/g.

Very preferably, its CTAB specific surface area is between 185 and 210 m²/g, in particular between 190 and 200 m²/g.

The CTAB specific surface area is the external surface area, which can be determined according to the NF T 45007 method (November 1987). The BET specific surface area can be measured according to the Brunauer-Emmett-Teller method described in "The Journal of the American Chemical Society", vol. 60, page 309 (1938) and corresponding to the standard NF T 45007 (November 1987).

One of the features of the precipitated silica obtained via the process according to the invention lies in the distribution of its pore volume and in particular in the distribution of the pore volume which is generated by the pores with diameters of less than or equal to 400 Å. The latter volume corresponds to the useful pore volume of the fillers employed in the reinforcement of elastomers.

Thus, the precipitated silica obtained via the process according to the invention has a pore distribution such that the pore volume generated by the pores with a diameter of between 175 and 275 Å (V2) represents less than 55%, in particular less than 50%, for example between 25% and 45%, of the pore volume generated by the pores with diameters of less than or equal to 400 Å (V1).

The pore volumes and pore diameters are measured by mercury (Hg) porosimetry using a Micromeritics Autopore 9520 porosimeter and are calculated by the Washburn relationship with a contact angle theta equal to 130° and a gamma surface tension equal to 484 dynes/cm (standard DIN 66133).

In addition, another feature of the precipitated silica obtained via the process according to the invention lies in the fact that it has a pore volume ($V_{d1}$), consisting of pores with a diameter of less than 1 μm, of greater than 1.50 cm³/g and preferably greater than 1.65 cm³/g; this pore volume may be greater than 1.70 cm³/g, for example between 1.75 and 1.80 cm³/g.

The ability to disperse (and to deagglomerate) of the precipitated silica obtained via the process according to the invention can be assessed by means of the following test, by a particle size measurement (by laser diffraction) carried out on a suspension of silica deagglomerated beforehand by ultrasonication (cleavage of the objects from 0.1 to a few tens of microns). Ultrasound deagglomeration is performed using a Vibracell Bioblock sonicator (750 W) equipped with a probe with a diameter of 19 mm. The particle size measurement is performed by laser diffraction on a Sympatec granulometer employing the Fraunhofer theory.

2 grams of silica are weighed into a pillbox (height: 6 cm and diameter: 4 cm) and the mixture is made up to 50 grams by the addition of deionized water: an aqueous 4% silica suspension is thus produced, which suspension is homogenized by magnetic stirring for 2 minutes. Ultrasound deagglomeration is subsequently carried out as follows: the probe being immersed over a length of 4 cm, it is set going for 5 minutes and 30 seconds at 80% of its nominal power (amplitude). The particle size measurement is then performed by introducing into the granulometer vessel a volume V (expressed in ml) of the homogenized suspension necessary to obtain an optical density of about 20.

The value of the median diameter $Ø_{50}$ which is obtained according to this test is proportionately smaller the higher the ability of the silica to deagglomerate.

A deagglomeration factor $F_D$ is given by the equation:

$$F_D = 10 \times V/\text{optical density of the suspension measured by the granulometer (this optical density is of the order of 20).}$$

This deagglomeration factor $F_D$ is indicative of the content of particles with a size of less than 0.1 μm which are not detected by the granulometer. This factor increases in proportion as the ability of the silica to deagglomerate increases.

In general, the precipitated silica obtained via the process according to the invention has a median diameter $Ø_{50}$, after ultrasound deagglomeration, of less than 8.5 μm, for example between 4 and 8 μm.

It usually has an ultrasound deagglomeration factor $F_D$ of greater than 5.5 ml, in particular of greater than 9 ml, for example of greater than 10 ml.

Preferably, the precipitated silica obtained via the process according to the invention has a content of fines (τf), after ultrasound deagglomeration, of at least 50%, for example of at least 55%.

Measurement of the content of fines (τf) i.e. of the proportion (by weight) of particles smaller than 0.3 μm in size, after ultrasound deagglomeration, is performed according to the test described below, and also illustrates the dispersibility of the precipitated silica used in the invention.

In this test, the dispersibility of the silica is measured by a particle size measurement (by sedimentation), performed on a silica suspension subjected beforehand to ultrasound deagglomeration. The ultrasound deagglomeration (or dispersion) is performed using a Vibracell Bioblock sonicator (600 W), equipped with a probe 19 mm in diameter. The particle size measurement is performed using a Sedigraph granulometer (sedimentation in the field of gravity+sweeping with an X-ray beam).

4 g of silica are weighed out in a pillbox (of volume equal to 75 ml) and the mixture is made up to 50 grams by addition of deionized water: an aqueous 8% silica suspension is thus produced, which is homogenized by magnetic stirring for 2 minutes. Ultrasound deagglomeration (dispersion) is then performed as follows: with the probe immersed over a length of 4 cm, the output power is adjusted so as to obtain a deflection of the power needle indicating 20%. Deagglomeration is performed for 210 seconds. The particle size measurement is then performed using a Sedigraph granulometer. To do this, the vertical sweep rate of the cell with the X-ray beam is first adjusted to 918, which corresponds to a maximum analyzed size of 85 μm. Deionized water is circulated in said cell, and the paper recorder is then set to electrical zero and mechanical zero (this adjustment being performed with the "100%" potentiometer of the recorder at the maximum sensitivity). The pencil of the paper recorder is placed at the point representing the starting size of 85 μm. The deagglomerated silica suspension, which has optionally been cooled beforehand, is then circulated in the Sedigraph granulometer cell (the particle size analysis being performed at 30° C.) and the analysis then begins. The analysis stops automatically once the size of 0.3 μm is reached (about 45 minutes). The content of fines (τf), i.e. the proportion (by weight) of particles smaller than 0.3 μm in size, is then calculated.

This content of fines (τf), or content of particles smaller than 0.3 μm in size, is proportionately higher the higher the dispersibility of the silica.

The precipitated silica obtained via the process according to the invention may have a fineness index (I.F.) of between 70 and 100 Å and in particular between 80 and 100 Å.

The fineness index (I.F.) represents the median radius of the intra-aggregate pores, i.e. the pore radius to which corresponds the pore surface area $S_0/2$ measured by mercury porosimetry ($S_0$ is the surface area provided by all the pores whose diameter is greater than or equal to 100 Å).

The precipitated silica obtained via the process according to the invention may have a packed filling density (PFD), in general, of greater than 0.26 and in particular 0.28; it is, for example, at least equal to 0.30.

The packed filling density (PFD) is measured according to standard NF T 30-042.

The pH of the precipitated silica used according to the invention is generally between 6.0 and 7.5.

The pH is measured according to the following method deriving from standard ISO 787/9 (pH of a 5% suspension in water):

Equipment:
calibrated pH meter (accuracy of reading to 1/100th)
combined glass electrode
200 ml beaker
100 ml measuring cylinder
balance accurate to 0.01 gram.

Procedure:
5 grams of silica are weighed out to within 0.01 gram in the 200 ml beaker. 95 ml of water, measured using the graduated measuring cylinder, are then added to the silica powder. The suspension thus obtained is vigorously stirred (magnetic stirring) for 10 minutes. The pH measurement is then carried out.

The precipitated silica obtained via the process according to the invention may be provided in the form of a powder with a mean size of at least 3 μm, in particular of at least 10 μm and preferably of at least 15 μm. This size is, for example, between 15 and 60 μm.

It can be provided in the form of granules (generally of substantially parallelepipedal shape) with a size of at least 1 mm, for example of between 1 and 10 mm, in particular along the axis of their greatest dimension (length).

It may preferably be in the form of substantially spherical beads with a mean size of at least 80 μm, preferably of at least 150 μm, in particular of between 150 and 300 μm, for example between 150 and 270 μm; this mean size is determined according to standard NF X 11507 (December 1970) by dry screening and determination of the diameter corresponding to a cumulative oversize of 50%.

The silica prepared via the process according to the invention may be used in many applications.

It may be used, for example, as a catalyst support, as an absorbent for active materials (in particular a support for liquids, especially those that are used in food, such as vitamins (vitamin E), choline chloride), in polymer, especially elastomer or silicone, compositions, as a viscosity enhancer, texturizer or anticaking agent, as a battery separator element, and as an additive for toothpaste, concrete or paper.

However, it finds a particularly advantageous application in the reinforcement of natural or synthetic polymers.

The polymer compositions in which it may be used, especially as a reinforcing filler, are generally based on one or more polymers or copolymers, in particular on one or more elastomers, preferably having at least a glass transition temperature of between −150° C. and +300° C., for example between −150° C. and +20° C.

Mention may in particular be made, as possible polymers, of diene polymers, in particular diene elastomers.

Mention may be made, as nonlimiting examples of finished articles based on said polymer compositions, of shoe soles, tires, floor coverings, gas barriers, flame-retardant materials, and also technical components such as cable car rollers, seals for domestic electrical appliances, seals for liquid or gas pipes, braking system seals, (flexible) pipes, sheathings (especially cable sheathings), cables, engine supports, conveyor belts and transmission belts.

The examples that follow illustrate the invention without, however, limiting the scope thereof.

EXAMPLE 1 (COMPARATIVE)

The following are introduced into a stainless steel reactor equipped with an impeller stirring system and with live steam heating in the reaction medium:
869 liters of water,
16.5 kg of $Na_2SO_4$ (electrolyte),
302 liters of aqueous sodium silicate, having an $SiO_2/Na_2O$ weight ratio equal to 3.46 and a density at 20° C. equal to 1.236.

The concentration of silicate (expressed as $SiO_2$) in the stock is then 64 g/l. The mixture is brought to a temperature of 82° C. with continued stirring.

348 liters of dilute sulfuric acid with a density at 20° C. equal to 1.053 (sulfuric acid with a weight concentration equal to 8.1%) are then introduced therein. The dilute acid is introduced at a flow rate of 522 l/h for 40 minutes until the pH of the reaction medium reaches a value (measured at its temperature) equal to 8.0.

The reaction temperature is 82° C. for the first 27 minutes of the reaction; it is then brought from 82° C. to 90° C. over approximately 13 minutes, then held at 90° C. until the end of the reaction.

Next, 94 liters of aqueous sodium silicate of the type described above and 120 liters of sulfuric acid, also of the type described above, are introduced together into the reaction medium, this simultaneous introduction of dilute acid and silicate being carried out so that the pH of the reaction medium, during this period of introduction, is always equal to 8.0±0.1.

After introducing all of the silicate, addition of the dilute acid is continued, at a flow rate of 298 l/h, for 8 minutes.

This additional introduction of acid then brings the pH of the reaction medium to a value equal to 4.4.

The total duration of the reaction is 88 minutes.

A slurry of precipitated silica is thus obtained, which is filtered and washed using a filter press so that a silica cake is finally recovered, the moisture content of which is 82% (therefore a solids content of 18% by weight). This cake is then fluidized by mechanical and chemical action (addition of an amount of sodium aluminate corresponding to an $Al/SiO_2$ weight ratio of 0.32%). After this disintegrating operation, a pumpable cake having a pH equal to 6.7 is obtained, which is then atomized using a nozzle atomizer.

The characteristics of the silica obtained (in the form of substantially spherical beads) are the following:

| | |
|---|---|
| BET surface area (m²/g) | 201 |
| CTAB surface area (m²/g) | 199 |
| $Ø_{50}$ (μm) * | 6.1 |
| $F_D$ (ml) * | 16.4 |
| V2/V1 (%) | 29.2 |
| IF (Å) | 98 |
| $V_{d1<1\ \mu m}$ (ml/g) | 1.72 |

* after ultrasound deagglomeration

EXAMPLE 2

The following are introduced into a stainless steel reactor equipped with an impeller stirring system and with live steam heating in the reaction medium:

1040 liters of water, 19.7 kg of $Na_2SO_4$ (electrolyte), 365 liters of aqueous sodium silicate, having an $SiO_2/Na_2O$ weight ratio equal to 3.46 and a density at 20° C. equal to 1.236.

The concentration of silicate (expressed as $SiO_2$) in the stock is then 64 g/l. The mixture is brought to a temperature of 82° C. with continued stirring.

210 liters of dilute sulfuric acid with a density at 20° C. equal to 1.053 (sulfuric acid with a weight content equal to 8.1%) are then introduced therein over the first 20 minutes of the reaction, and 11 liters of concentrated sulfuric acid with a density at 20° C. equal to 1.83 (sulfuric acid with a weight content equal to 94%) are then introduced therein until the pH of the reaction medium reaches a value (measured at its temperature) equal to 8.0.

The reaction temperature is 82° C. for the first 20 minutes of the reaction; it is then brought from 82° C. to 90° C. over approximately 13 minutes, then held at 90° C. until the end of the reaction.

Next, 107 liters of aqueous sodium silicate of the type described above and 6.9 liters of concentrated sulfuric acid, of the type described above, are introduced together into the reaction medium, this simultaneous introduction of concentrated acid and silicate being carried out so that the pH of the reaction medium, during this period of introduction, is always equal to 8.0±0.1.

After introducing all of the silicate, addition of the concentrated acid is continued, at a flow rate of 18.9 l/h, for 8 minutes.

This additional introduction of acid then brings the pH of the medium to a value equal to 4.3.

The total duration of the reaction is 88 minutes.

Compared to example 1, the following are observed:
- a gain in reaction productivity (as regards the final concentration expressed as $SiO_2$ of the reaction medium) of 20%,
- a saving in the water consumption of the reaction of 17%,
- a saving in the consumption of energy (in the form of live steam) in the reaction of 16%.

A slurry of precipitated silica is thus obtained, which is filtered and washed using a filter press so that a silica cake is finally recovered, the moisture content of which is 84% (therefore a solids content of 16% by weight). This cake is then fluidized by mechanical and chemical action (addition of an amount of sodium aluminate corresponding to an $Al/SiO_2$ weight ratio of 0.33%). After this disintegrating operation, a pumpable cake having a pH equal to 6.2 is obtained, which is then atomized using a nozzle atomizer.

The characteristics of the silica obtained (in the form of substantially spherical beads) are the following:

| | |
|---|---|
| BET surface area (m²/g) | 209 |
| CTAB surface area (m²/g) | 201 |
| $Ø_{50}$ (µm) * | 4.4 |
| $F_D$ (ml) * | 21.4 |
| V2/V1 (%) | 22.4 |
| IF (Å) | 94 |
| $V_{d1<1\,\mu m}$ (ml/g) | 1.74 |

* after ultrasound deagglomeration

The invention claimed is:

1. A process for preparing precipitated silica, the process comprising:
    reacting a silicate with at least one acid in the following manner such that a precipitate is formed:
    (i) forming an initial stock comprising at least a portion of the total amount of the silicate involved in the reaction and an electrolyte, the concentration of silicate expressed as $SiO_2$ in said initial stock being between 50 and 70 g/l,
    (ii) adding an acid to said initial stock to form a reaction medium until a pH value of the reaction medium of between 7 and 8.5 is obtained,
    (iii) adding an acid to the reaction medium and optionally simultaneously adding the remaining amount of the total amount of the silicate involved in the reaction, and
    (iv) adding an acid to the reaction medium, until a pH value of the reaction medium of between 4 and 6 is obtained;
    filtering the precipitate and washing using a filter equipped with a compacting means, to obtain a suspension of precipitated silica; and
    drying the suspension of precipitated silica by atomization,
    wherein, step (ii) comprises adding, for x minutes, a dilute acid followed by adding, after x minutes, a concentrated acid, where x is between 15 and 20, and wherein the acid used in step (iii) is a concentrated acid, wherein the concentrated acid, independently in each of steps (ii) and (iii), is selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

2. The process as claimed in claim 1, wherein in step (iii), the acid and silicate are added simultaneously to the reaction medium.

3. The process as claimed in claim 1, wherein the acid used in step (iv) is a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

4. The process as claimed in claim 1, wherein, in step (ii), the concentrated acid is added after reaching a gel point in the reaction medium.

5. The process as claimed in claim 1, wherein said concentrated acid is sulfuric acid with a concentration of at least 80% by weight.

6. The process as claimed in claim 1, wherein said concentrated acid is sulfuric acid with a concentration of between 90% and 98% by weight.

7. The process as claimed in claim 1, wherein said concentration of silicate expressed as $SiO_2$ in said initial stock is between 50 and 65 g/l.

8. The process as claimed in claim 1, wherein said electrolyte is sodium sulfate, its concentration in the initial stock being between 12 and 20 g/l.

9. The process as claimed in claim 1, wherein said drying is performed using a nozzle atomizer.

10. The process as claimed in claim 1, wherein the separation comprises filtration, washing and then compacting, using a filter press.

11. The process as claimed in claim 1, wherein the drying step provides a dried product, and wherein said dried product is milled, and then optionally agglomerated.

12. The process as claimed in claim 11, wherein the dried product is then agglomerated.

13. The process as claimed in claim 1, wherein the obtained suspension of precipitated silica has a solids content of at most 22% by weight.

* * * * *